Oct. 26, 1926.

H. WEICHSEL 1,604,431

ALTERNATING CURRENT MOTOR

Filed May 15, 1924

INVENTOR
Hans Weichsel
BY E. E. Huffman
ATTORNEY

Patented Oct. 26, 1926.

1,604,431

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed May 15, 1924. Serial No. 713,423.

My invention relates to alternating current motors particularly of the self-excited synchronous type and its purpose is to produce a stator winding construction and arrangement which will result in economy in copper, simplification of starting equipment, and at the same time secure satisfactory starting and running performance.

Figure 1:
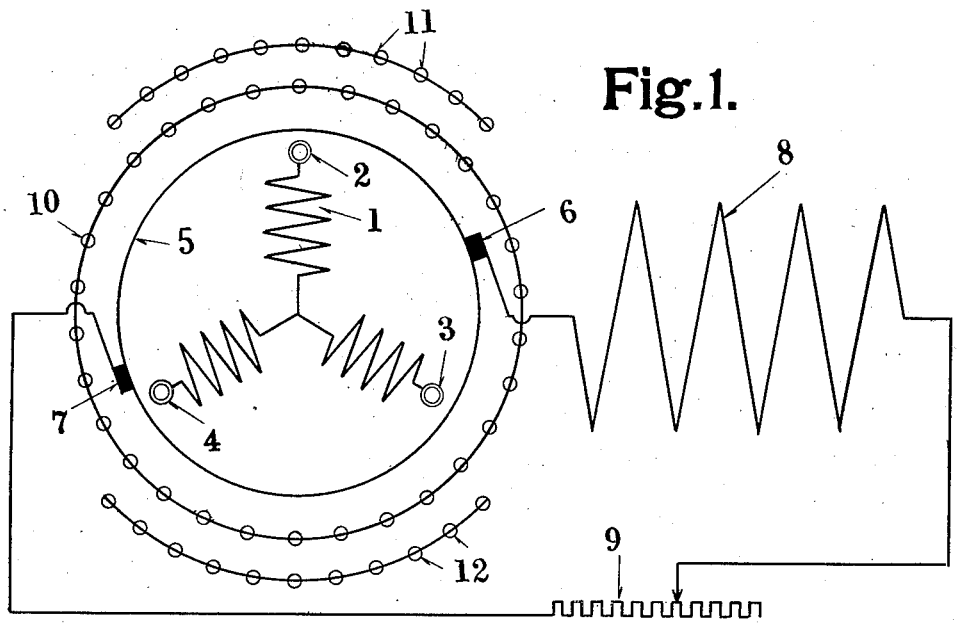
Figure 2:
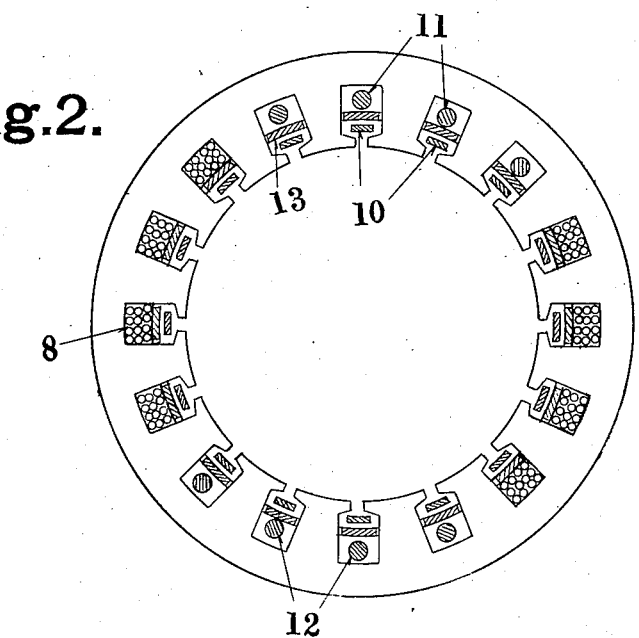

In the accompanying drawings Figure 1 is a diagrammatic view of the circuits and connections of my improved motor; and Figure 2 is a view showing the relation and arrangement of the stator windings.

The inducing member, which in the machine shown is the rotor, is provided with a polyphase winding 1 supplied with current through slip rings 2, 3 and 4. The rotor also carries commuted winding 5 with which brushes 6—7 cooperate. The induced member, which is of the type having no defined polar projections, is provided with an exciting winding 8 in circuit with the brushes through adjustable resistance 9. The axis of the winding 8 is preferably displaced by a small angle from the axis of the brushes as shown.

It will be understood that the machine as thus far described will operate as a synchronous motor, a unidirectional excitation being supplied by the winding 8 since at synchronism a direct current E. M. F. appears at the brushes 6—7. Such a machine, however, would not have good starting characteristics and in accordance with my invention I provide the induced member with a high resistance squirrel-cage winding 10 and with low resistance windings 11 and 12 permanently short-circuited along a plurality of axes by having the ends of the conductors joined by end rings as in a squirrel-cage winding. The conductors of these windings 11 and 12 are located in the bottoms of the stator slots and are separated from the conductors of the high resistance winding by magnetic bridges in the form of wedges of magnetic material 13 which afford a path for magnetic lines to pass through the induced member without linking with the windings 11 and 12. The conductors of the exciting winding and the conductors of the windings 11 and 12 are each located in a portion only of the stator slots, and the magnetization axes of the windings 11 and 12 are displaced from the axis of the winding 8. In the form shown in Figure 2 the conductors of the exciting winding are also in the bottoms of their slots and separated from the conductors of the winding 10 by magnetic wedges 13. This arrangement, as hereinafter explained, makes it unnecessary to employ the starting resistance 9. The wedges between the conductors of windings 8 and 10 may be omitted, however, in which case resistance 9 would be employed to limit the current in winding 8 at starting. As a further modification conductors of the winding 10 may be also omitted in the slots carrying the winding 8 and these slots filled with conductors of this winding.

Referring to the starting operation of the machine shown in Figure 2, the circuit of the winding 8 being closed polyphase current is supplied through the slip rings. The revolving field set up in the rotor causes induced currents to flow in the high resistance squirrel-cage winding 10, which currents cooperate with the field to produce starting torque. During the initial starting period the windings 8, 11 and 12 are substantially inactive due to the screening effect of the magnetic bridges 13. As the speed approaches synchronism the screening effect of the magnetic bridges 13 decreases due to decreased frequency of the currents induced in the windings 8, 11 and 12. The currents induced in the high resistance squirrel-cage winding 10 decrease with increasing armature speed. Therefore, with an increasing armature speed the ratio of the currents flowing in windings 8, 11 and 12 to the currents flowing in winding 10 becomes larger with the result that the torque producing effect of the windings 8, 11 and 12 increases as the torque producing effect of the winding 10 decreases. Thus a machine constructed as described has satisfactory torque over the whole starting period and consequently throughout a considerable range of sizes, the embodiment of my invention illustrated in the drawings avoids the necessity of any external starting devices whatever.

Having fully described my invention, what I claim as new and desire to secure by Letters Patent of the United States is:

1. In an alternating current motor, the combination of inducing member provided with a commuted winding and an inducing winding, of an induced member having an exciting winding in circuit with the commuted winding, and a short-circuited winding on the induced member and separated from the inducing member by means forming a path for magnetic lines to pass through the induced member without linking with said short-circuited winding, said short-circuited winding being so constructed and positioned as not to produce magnetization in the axis of the exciting winding.

2. In an alternating current motor, the combination of an inducing member provided with a commuted winding and an inducing winding, of an induced member provided with winding slots distributed entirely around its inner periphery, an exciting winding having its conductors located in a portion only of the slots of the induced member, and a low resistance short-circuited winding on the induced member having at least a portion of its conductors located in slots other than those containing conductors of the exciting winding, the conductors of the short-circuited winding being separated from the inducing member by means forming a path for magnetic lines to pass through the induced member without linking with said winding.

3. In an alternating current motor, the combination of an inducing member provided with a commuted winding and inducing winding, of an induced member provided with winding slots distributed entirely around its inner periphery, an exciting winding in circuit with the commuted winding and having its conductors located in a portion only of the slots of the induced member, a low resistance short-circuited winding on the induced member having at least a portion of its conductors located in slots other than those containing conductors of the exciting winding, the conductors of the short-circuited winding being separated from the inducing member by means forming a path for magnetic lines to pass through the induced member without linking with said winding, and a high resistance squirrel-cage winding having conductors in all slots of the induced member.

4. In an alternating current motor, the combination of an inducing member provided with a commuted winding and an inducing winding, of an induced member provided with winding slots distributed entirely around its inner periphery, an exciting winding having its conductors located in a portion only of the slots of the induced member, and a low resistance short-circuited winding on the induced member having at least a portion of its conductors located in slots other than those containing conductors of the exciting winding, the conductors of the short-circuited winding and of the exciting winding being separated from the inducing member by means forming a path for magnetic lines to pass through the induced member without linking with said windings.

5. In an alternating current motor, the combination of an inducing member provided with a commuted winding and an inducing winding, of an induced member provided with winding slots distributed entirely around its inner periphery, and exciting winding in circuit with the commuted winding and having its conductors located in a portion only of the slots of the induced member, a low resistance short-circuited winding on the induced member having at least a portion of its conductors located in slots other than those containing conductors of the exciting winding, the conductors of the short-circuited winding and of the exciting winding being separated from the inducing member by means forming a path for magnetic lines to pass through the induced member without linking with said windings, and a high resistance squirrel-case winding having conductors in all slots of the induced member.

In testimony whereof, I have hereunto set my hand this the 12th day of May, 1924.

HANS WEICHSEL.